United States Patent [19]

Poirier

[11] Patent Number: 5,699,859

[45] Date of Patent: Dec. 23, 1997

[54] WELL WATER RECIRCULATION VALVE AND METHOD OF MANUFACTURING THEREOF

[76] Inventor: Blair J. Poirier, P. O. Box 251, Shediac Bridge, New Brunswick, Canada, E0A 3H0

[21] Appl. No.: 615,334

[22] Filed: Mar. 11, 1996

[51] Int. Cl.⁶ .................... C02F 1/72; F04B 47/06
[52] U.S. Cl. .................... 166/112; 29/890.14; 137/315; 137/515.5; 137/563; 210/747; 417/434
[58] Field of Search .................... 166/112, 265, 166/369; 137/315, 515, 515.5, 563; 210/170, 747; 417/434; 29/890.149, 890.12, 890.121, 890.123, 890.142, 890.144

[56] References Cited

U.S. PATENT DOCUMENTS

| | | | |
|---|---|---|---|
| 2,561,221 | 7/1951 | Osburn | 417/434 |
| 4,362,478 | 12/1982 | Huckaby | 417/434 |
| 4,400,271 | 8/1983 | Lunceford | 210/136 |
| 4,444,259 | 4/1984 | Schwall | 166/265 |
| 4,543,186 | 9/1985 | Weisenbarger | 210/221.2 |
| 4,582,610 | 4/1986 | Baker | 210/747 |
| 5,069,286 | 12/1991 | Roensch | 166/312 |
| 5,103,914 | 4/1992 | LaHaye | 166/310 |
| 5,104,554 | 4/1992 | Dempsey | 210/747 |

FOREIGN PATENT DOCUMENTS 1301639  1/1989  Canada .

Primary Examiner—David J. Bagnell
Attorney, Agent, or Firm—Mario D. Theriault

[57] ABSTRACT

A well water recirculation valve comprising an in-line check valve and a calibrated orifice through the body of the check valve. The orifice communicates through the body of the check valve into an unchecked end thereof. In use in a water well having a submersed pump, the recirculation valve is spliced into a well pipe at a location below the top of a well but above an average static water level in that well. The recirculation valve of the present invention recirculates a portion of the water pumped through the well pipe back into the well for preventing a stagnation of a head portion of that well.

20 Claims, 2 Drawing Sheets

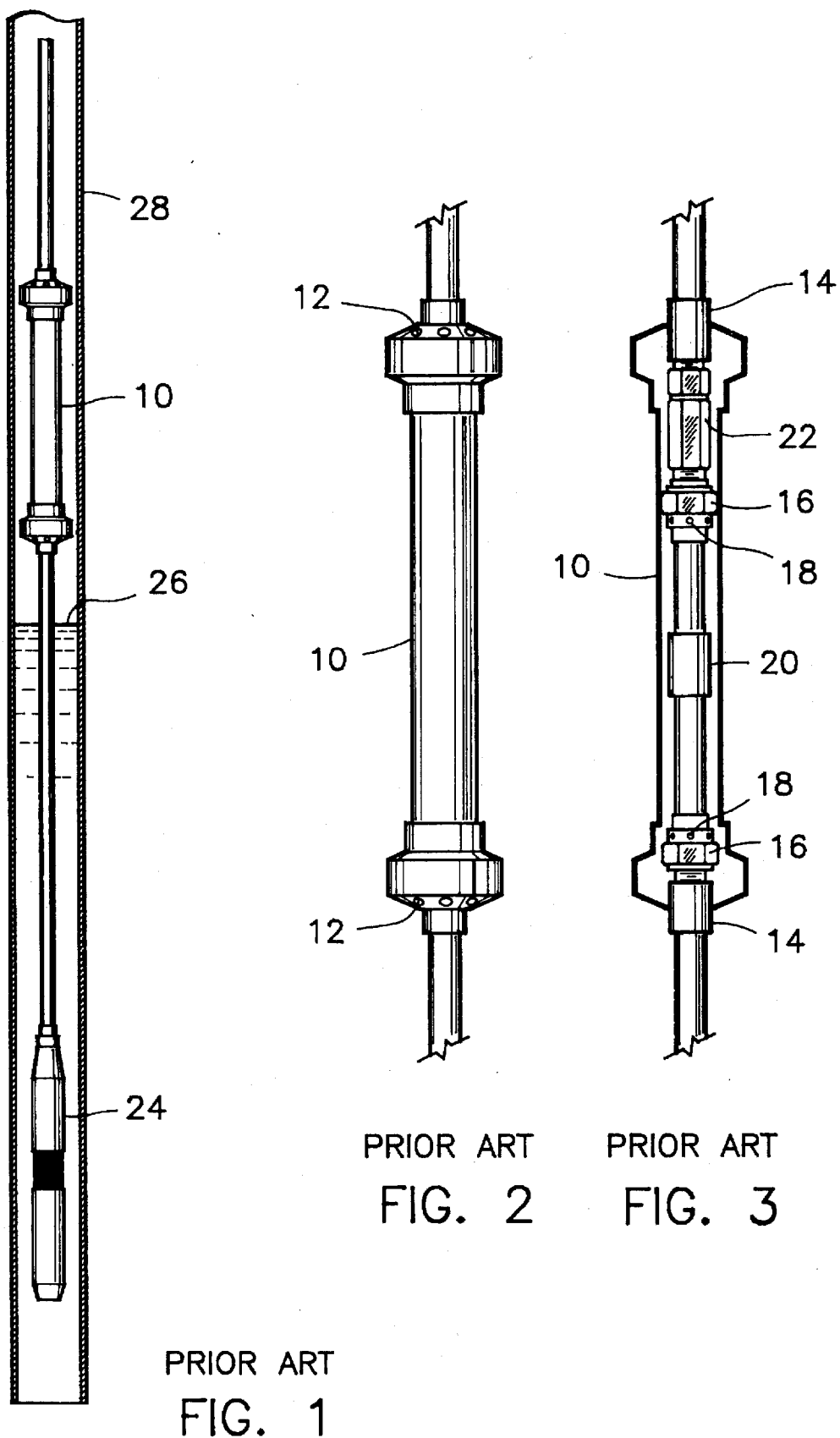
PRIOR ART
FIG. 2
PRIOR ART
FIG. 3
PRIOR ART
FIG. 1

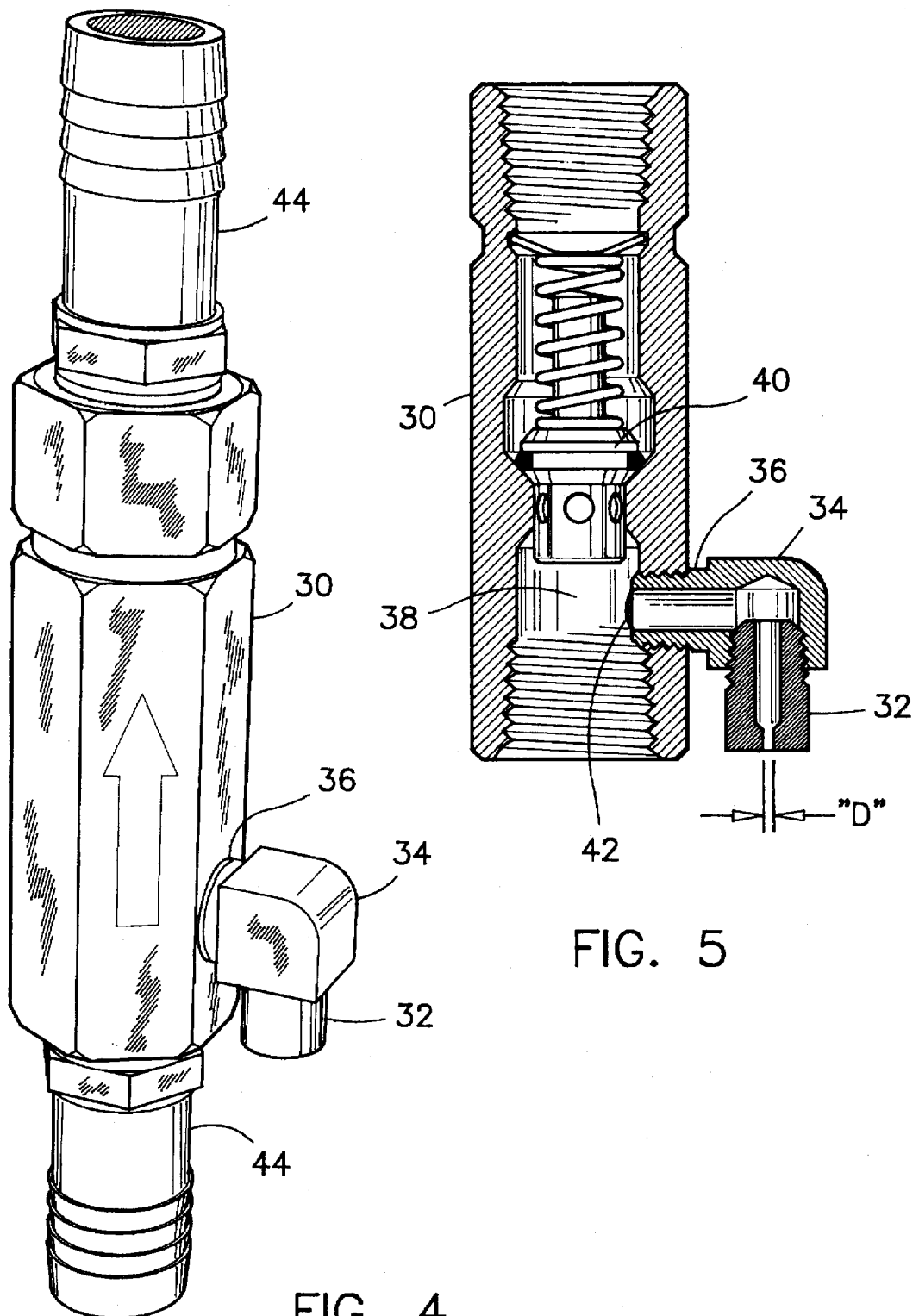
FIG. 5
FIG. 4

WELL WATER RECIRCULATION VALVE AND METHOD OF MANUFACTURING THEREOF

FIELD OF THE INVENTION

The present invention relates to a recirculation valve spliced into a well pipe, to recirculate a portion of the well water pumped through that pipe back into the well, to prevent a stagnation of a head portion of that well. More particularly, the present invention is an improvement to the well water aeration system as disclosed in U.S. Pat. No. 4,582,610, issued on Apr. 15, 1986 to Martin Baker.

BACKGROUND OF THE INVENTION

In a water well having a good rate of recovery, the head portion of that well above the water intake opening of a well pipe is rarely utilized. When it is utilized, however, during winter or during prolonged periods of dry weather, it is a common occurrence that the water has a unpleasant smell.

During these periods, it is also a common occurrence to observe a bacterial formation of a jelly-like substance inside reservoirs of toilets for example. A most probable cause of such rancidity in the well water is the stagnation of the head portion of the well for an extended period of time.

Various efforts have been made in the past to prevent the contamination of a well. In a first example, the U.S. Pat. No. 4,543,186 issued on Sep. 24, 1985, to Weisenbarger et al. discloses an apparatus and a method for the treatment of well water. The method comprises the recirculation of a portion of the water pumped from the well through a magnetic unit and an aerator assembly. The treated water is sprayed back into the well.

Although the disclosure does not specify a preferred volume of water to be sprayed back into the well, it is suggested therein to install a shut-off valve on the inlet end of the by-pass tubing to control the rate of flow of water through the venturi.

In another example, U.S. Pat. No. 5,103,914 issued on Apr. 14, 1992 to Philip LaHaye, discloses a system for chemically treating water in a well. In this invention, a portion of between 2-10% of the water flowing through a well pipe is diverted through an external tank, mixed with a concentrated chemical and pumped back into the well. In this invention there is also provided a metering valve to control the rate of flow of treated water back into the well casing.

It has been found that the mere recirculation of water into a well, in a proportion of about 5 to 10% of the daily water demand from this well is sufficient to prevent the stagnation of the head portion of that well.

For example, an average consumption of water in a house can be estimated as being typically between 50 and 100 U.S. gallons per person per day. Accordingly, the recirculation of a volume equivalent to 5% of the total volume of water taken from a well of a four-person household represents a volume of about 10 to 20 gallons of water per day. In a typical 6 inches diameter well casing having a 1½ inches pipe therein, this volume represents a casing height of about between 7 to 14 feet.

This volume is taken from an active portion of the well, near the submersed pump, and recirculated back onto the head portion of the well. Such dilution and addition of water on the top of the well forces the head portion downwardly by the approximately the above distance, and is sufficient to maintain the entire well active.

In the aforementioned U.S. Pat. No. 4,582,610, the well water aeration method disclosed therein consists of recirculating water in a well without treating or adding chemicals to the recirculated water. In the disclosed method, a portion of between 30-50% of the water taken out of a well is sprayed back into the well. The object of the spray is to aerate this water, and to remove the volatile contaminants which may be present in it.

The well water aeration system uses an elongated spray conduit spliced into the well pipe at a location below the top of the well but above the average static water level in that well. The spray conduit has a plurality of spray holes in its lower end to evacuate water accumulating therein, and another plurality of holes of an upper end thereof to evacuate the air from the conduit when pumping resumes.

The spray conduit of the prior art comprises many pieces and the installation thereof might only be done properly by an experienced plumber. Furthermore, such an installation where a portion of about 30-50% of the water taken from the well is recirculated back into the well, is likely to require the installation of a larger pump in order to maintain an adequate delivery of water to the system's reservoir.

For these reasons, the spray conduit of the prior art may not be appropriate for a retrofit installation on an existing water well. It may neither be appropriate for selling in a hardware store where the installation instructions therefor are rather complicated, and are addressed specifically to experienced plumbers.

SUMMARY OF THE INVENTION

In the present invention, however, there is provided a well water recirculation valve comprising essentially an in-line check valve and a calibrated orifice through the body of the check valve.

In use in a water well having a submersed pump, the recirculation valve is spliced into a well pipe at a location below the top of a well but above an average static water level in that well. The recirculation valve of the present invention recirculates a portion of the water pumped through the well pipe back into the well for preventing a stagnation of a head portion of that well.

In accordance to one aspect of the present invention, the orifice communicates through the body of the in-line check valve into an unchecked end thereof, near the gate of the valve. A first advantage of this aspect of the present invention is that the air accumulating in the valve body during non-use periods of the pump is minimal as compared the spray conduit of the prior art. Thus the air forced into the piping system at every time the pump starts is also minimal. This is a commendable feature especially where the air inside the casing of a well may contain undesirable odours and gases.

In accordance to another aspect of the present invention, the orifice of the recirculation valve is a calibrated opening. The dimension of this opening is relative to a depth of installation of the in-line check valve in the well. Hence, an ideal water recirculation ratio in a well is defined by measuring the average static water level of this well, by estimating the daily demand of water from the well, and by reading a corresponding suggested orifice dimension from a chart showing an ideal water recirculation volume. Such an installation procedure is advantageous over the methods of the prior art using metering valves to obtain a recirculation volume which is in most cases subjectively determined by the person installing the device.

In accordance to a further aspect of the present invention, the well water recirculation valve is manufactured from commercially available plumbing components. Hence, a manufacture of a recirculation valve comprises the steps of: obtaining a commercially available in-line check valve; drilling and tapping a hole through the body of this check valve, into an unchecked portion thereof; mounting a 90° street elbow fitting in that hole, with the female threaded portion of that elbow fitting oriented toward an inlet end of the check valve; machining a calibrated orifice the shape of a threaded hollow stem; and mounting this calibrated orifice in the female threaded portion of the elbow fitting.

The manufacture of a recirculation valve of the present invention may also comprise the additional step of mounting at both ends thereof, a PVC pipe adaptor the size of which is common to PVC piping normally used in residential wells.

The well water recirculation valve of the present invention is thereby easy to manufacture with minimum tooling. The size of the recirculation valve is relatively small whereby it can be displayed for sale with other pipe fittings available at a hardware store.

The well water recirculation valve has no metering device to adjust. Its function and installation instructions are relatively simple such that it can be marketed directly to homeowners having a limited experience in well piping systems.

BRIEF DESCRIPTION OF THE DRAWINGS

The preferred embodiment of the invention will be further understood from the following description, with reference to the drawings in which:

FIG. 1 is a cross-section view of a water well casing with a submersed pump and a spray conduit of the prior art therein;

FIG. 2 is an enlarged side view of the spray conduit of the prior art;

FIG. 3 is a cross-section view through the spray conduit of the prior art;

FIG. 4 is a perspective side view of the recirculation valve of the preferred embodiment;

FIG. 5 is a cross-section view of the recirculation valve of the preferred embodiment.

DETAILED DESCRIPTION OF THE PREFERRED EMBODIMENT

Referring to FIGS. 1, 2 and 3, the spray conduit 10 of the prior art has spray holes 12 at the top and bottom portion thereof. The spray conduit 10 also comprises a top and bottom adaptors 14, top and bottom unions 16, each having apertures 18, a pipe coupling 20 and a check valve 22 to prevent a runback of water from the system's reservoir when pumping of water through the pipe stops. The apertures 18 in both unions 16 are calibrated to recirculate preferably between 30–50% of the water flowing through the pipe.

The spray conduit 10 of the prior art is preferably installed in cooperation with a submersed pump 24. The spray conduit 10 of the prior art is also preferable installed above the static level of water 26 in a well casing 28, such that the recirculated water falls back into the head portion of that well.

Referring now to FIGS. 4 and 5, there is illustrated a recirculation valve 30 of the preferred embodiment. The recirculation valve 30 is generally a similar in-line check valve as the check valve 22 in the spray conduit 10 of the prior art. The recirculation valve 30 prevents a runback of water in the well pipe when pumping stops. The recirculation valve 30 is also preferably used in cooperation with a submersed pump, and is also installed above a static water level in a well casing.

In use when water is pumped through the well pipe and through the recirculation valve 30, a nominal volume of water is sprayed through an orifice 32, aerating this nominal volume, and forcing the head portion of the well downwardly towards the pump's intake.

The orifice 32 is preferably a threaded fitting mounted in a 90° street elbow 34 and oriented downwardly relative to an installation position of the recirculation valve 30.

The elbow 34 preferably has a threaded stem 36 engaged into a threaded hole through the valve's body. The threaded hole is at a location where the orifice 32 communicates with an unchecked region 38 of the valve, that is on the pump end of the valve gate 40.

The elbow 34 preferably has on the inlet end of the threaded stem 36, a screen filter 42 to prevent a blocking of the orifice 32 from particulate which may be found in well water. The screen filter 42 may be brazed on or otherwise attached to the end of the threaded stem 36 such that a flow of water through the check valve 30 is tangential to it and prevents a clogging of it with time.

The recirculation valve 30 of the preferred embodiment 30 is preferably a type having a visual symbol on its body indicating a direction of the flow therein. It is also preferably commercialized with PVC pipe adaptors 44, such that a retrofit installation on a well pipe may be easily understood and properly effected by homeowners having minimum installation instructions.

The orifice 32 of the preferred embodiment is calibrated according the to depth of the static water level in a well, or a depth of installation of the recirculation valve, and a daily cumulative period of operation of the water pump. The science of Fluid Mechanics teaches that a flow of water from a reservoir through an orifice is directly proportional to the pressure inside that reservoir. Accordingly, a flow of water through the orifice 32 of the recirculation valve 30 is proportional to the maximum pressure setting of the pumping system, 40 psi for example, plus the pressure from the height of water in the well pipe above the recirculation valve 30.

The science of Fluid Mechanics further teaches that a flow of liquid through an orifice in a reservoir is calculated according to the following formula:

$$\text{Flow} = C \times A \, (2 \times g \times h)^{1/2}$$

wherein:

"C" is a coefficient of orifices; this coefficient is 0.80 for a short-tube-type orifice.

"A" is the cross-sectional area of the orifice,

"g" is the acceleration due to gravity: 32.17 ft/sec$^2$.

"h" is the fluid height above the orifice.

For calculations purpose the pressure maintained in the piping system and reservoir of the house is converted in height of fluid. In this respect, a pressure of 40 psi corresponds to a fluid height of 92 ft. The total fluid height entered in the above formula is therefor 92 feet plus the height of fluid in the well pipe above the recirculation valve 30.

Also for calculations purposes, it has been found that a typical residential water pump having a capacity of between 5–15 U.S. gpm operates for a total duration of between ½ hour and 1½ hour or more per day to supply the typical water demand of a four-person household. Therefore, a volume of water corresponding to 8 feet of casing length per each ½ hour of cumulative pump operation has been defined as a proper recirculation of water in a residential well without adversely affecting the pump capacity. This volume corresponds to about 11 U.S. gallons of water per day in a 6" diameter casing, or about 5.5% of a minimum daily demand of 200 U.S. gallons.

A typical orifice 32 for use in a residential well may be selected from a chart showing recommended recirculation volumes. For example, a preferred inside diameter "D" of the orifice may be selected from the following chart according to a static level of water in the well. This particular chart applies to a daily demand on the well of about 200 U.S. gallons, and a cumulative daily pump operation of about ½ hour.

DAILY DEMAND ON WELL: 200 U.S.G
CUMULATIVE PUMP OPERATION: ½ HR/DAY
CASING DIAMETER: 6" VOLUME HEIGHT: 8 ft.

| Depth of Valve | Dia. of Orifice | Volume Recirc'd |
| --- | --- | --- |
| 25 feet | 0.046" | 11 U.S.g/day |
| 50 feet | 0.044" | 11 U.S.g/day |
| 100 feet | 0.041" | 11 U.S.g/day |
| 200 feet | 0.031" | 11 U.S.g/day |
| 300 feet | 0.034" | 11 U.S.g/day |

Similarly, the following orifice diameters "D" are preferred for commercial or industrial applications having an 8" diameter well casing, a minimum demand of 1000 gallons per day, and a cumulative daily pump operation period of about one hour. These dimensions are based on the recirculation of a volume of water corresponding to a casing height of 20 feet.

DAILY DEMAND ON WELL: 1000 U.S.G
CUMULATIVE PUMP OPERATION: 1 HR/DAY
CASING DIAMETER: 8" VOLUME HEIGHT: 20 ft.

| Depth of Valve | Dia. of Orifice | Volume Recirc'd |
| --- | --- | --- |
| 25 feet | 0.070" | 50 U.S.g/day |
| 50 feet | 0.067" | 50 U.S.g/day |
| 100 feet | 0.062" | 50 U.S.g/day |
| 200 feet | 0.056" | 50 U.S.g/day |
| 300 feet | 0.052" | 50 U.S.g/day |

An important advantage of selecting an orifice diameter from a chart of recommended orifice diameters, is that an ideal recirculation volume may be defined according to a well condition, before installing the recirculation valve on that well. There is no metering valve to adjust, and no trial-and-error procedure involved. A recirculation volume through the valve is predictable, such that a new delivery of water from an original water pump is also predictable.

Another advantage of such an orifice diameter under one tenth of an inch is that the orifice 32 has a similar effect as an atomizing nozzle. The water expelled under pressure from this recirculation valve is sprayed widely providing a good aeration and an efficient removal of any volatile contaminant that may be present in the water.

While the above description provides a full and complete disclosure of the preferred embodiment of this invention, various modifications, alternate constructions and equivalents may be employed without departing from the true spirit and scope of the invention. Such changes might involve alternate, components, structural arrangements, sizes, operational features or the characteristics of the like, Therefore the above description and accompanying illustrations should not be construed as limiting the scope of the invention which is defined by the appended claims.

I claim:

1. In a well water aeration system having a submersed pump and a well water recirculator spliced into a well pipe at a location below the top of the well but above an average static water level in said well, for recirculating a portion of the water pumped through said pipe back into said well for preventing a stagnation of a head portion of said well, the improvement being that said well water recirculator comprises essentially an inn-line check valve and an orifice communicating through a body of said check valve into an unchecked portion thereof, said orifice being a calibrated opening, a dimension of which is relative to a depth of said in-line check valve in said well.

2. The well water recirculator as claimed in claim 1 wherein said orifice is connected to said body of said in-line check valve by means of a 90° street elbow fitting, and said orifice is oriented during use towards said head portion of said well.

3. The well water recirculator as claimed in claim 2 wherein an inlet end of said elbow fitting has a screen filter for preventing an obstruction thereof during use, by water-carried particulate.

4. The well water recirculator as claimed in claim 1 wherein said dimension of said calibrated opening is also relative to a demand of water from said well.

5. The well water recirculator as claimed in claim 4 wherein an inside diameter of said opening, when said well is a residential well, is less than one tenth of an inch.

6. The well water recirculator as claimed in claim 5 wherein said inside diameter in between 0.034" and 0.046".

7. The well water recirculator as claimed in claim 4 wherein said portion of water recirculated through said orifice is equivalent to about between 5% and 10% of the water pumped through said pipe.

8. The well water recirculator as claimed in claim 1 wherein said pipe is a PVC pipe and said in-line check valve is spliced into said pipe by means of two PVC pipe adaptors.

9. A water well recirculation valve for splicing into a well pipe of a well having a submersed pump, at a location below the top of a well but above an average static water level in said well, for recirculating a portion of the water pumped through said well pipe back into said well for preventing a stagnation of a head portion of said well, said well water recirculation valve comprising an in-line check valve and an orifice communicating through a body of said in-line check valve into an unchecked portion thereof, said orifice being a calibrated opening, a dimension of which being relative to a recommended installation depth of said in-line check valve in said well.

10. A well water recirculation valve as claimed in claim 9 wherein said orifice is connected to said body of said in-line check valve by means of a 90° street elbow fitting, and said orifice is oriented during use towards said head portion of said well.

11. A well water recirculation valve as claimed in claim 10 wherein an inlet end of said elbow fitting has a screen filter for preventing an obstruction thereof during use, by water-carried particulate.

12. A well water recirculation valve as claimed in claim 9 wherein said dimension of said calibrated opening being also relative to an estimated demand of water from said well.

13. A well water recirculation valve as claimed in claim 12 wherein an inside diameter of said opening, when said well is a residential well, is less than one tenth of an inch.

14. A well water recirculation valve as claimed in claim 13 wherein said inside diameter in between 0.034" and 0.046".

15. A well water recirculation valve as claimed in claim 12 wherein said portion of water recirculated through said orifice is equivalent to about between 5% and 10% of the water pumped through said pipe.

16. A well water recirculation valve as claimed in claim 9 wherein said in-line check valve has on an inlet end and on an outlet end, a PVC pipe adaptor.

17. A manufacture of a well water recirculation valve comprising the steps of:

obtaining a commercially available in-line check valve;

drilling and tapping a hole through a body of said in-line check valve, into an unchecked portion thereof;

mounting a 90° street elbow fitting in said hole, with a female thread portion of said elbow fitting oriented toward an inlet end of said check valve;

machining a calibrated orifice having a shape of a threaded hollow stem;

mounting in said female thread portion said calibrated orifice.

18. A manufacture of a well water recirculation valve as claimed in claim 17 comprising the additional step of installing on an inlet end of said elbow fitting a screen filter for preventing an obstruction thereof during use.

19. A manufacture of a well water recirculation valve as claimed in claim 17 comprising the additional step of calibrating said orifice according to a proposed depth of installation of said valve.

20. A manufacture of a well water recirculation valve as claimed in claim 17 comprising the additional step of mounting at both ends of said in-line check valve, a PVC pipe adaptor, such that an installation instruction of said recirculation valve on a well pipe is readily understood by a homeowner having limited experience with plumbing systems.

* * * * *